US010606771B2

United States Patent
Trivedi et al.

(10) Patent No.: US 10,606,771 B2
(45) Date of Patent: Mar. 31, 2020

(54) REAL TIME STACK PROTECTION

(71) Applicant: Infineon Technologies AG, Neubiberg (DE)

(72) Inventors: Sanjay Trivedi, Bangalore (IN); Ramesh Babu, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 118 days.

(21) Appl. No.: 15/876,500

(22) Filed: Jan. 22, 2018

(65) Prior Publication Data

US 2019/0227953 A1  Jul. 25, 2019

(51) Int. Cl.
| | |
|---|---|
| G06F 12/14 | (2006.01) |
| G06F 21/52 | (2013.01) |
| G06F 9/44 | (2018.01) |
| G06F 9/48 | (2006.01) |
| G06F 9/30 | (2018.01) |

(52) U.S. Cl.
CPC .......... G06F 12/1483 (2013.01); G06F 9/30 (2013.01); G06F 9/4818 (2013.01); G06F 12/145 (2013.01); *G06F 9/30134* (2013.01); *G06F 9/30163* (2013.01); *G06F 21/52* (2013.01); *G06F 2212/1052* (2013.01)

(58) Field of Classification Search
CPC .......... G06F 21/10; G06F 21/52; G06F 21/71; G06F 21/79; G06F 12/0684; G06F 12/1491; G06F 12/0875; G06F 12/14; G06F 12/145; G06F 12/1458; G06F 12/1483; G06F 2212/1052; G06F 2212/2147; G06F 7/49905; G06F 9/4818; G06F 9/30134; G06F 9/30163; G06F 9/30; G06F 21/75; G06F 21/755; G06F 21/6218
USPC .............. 712/227, 231, 242, 243, 244, 248; 711/132, 152, 163; 726/132, 152, 163, 726/27, 30; 713/165
See application file for complete search history.

(56) References Cited

U.S. PATENT DOCUMENTS

| | | | |
|---|---|---|---|
| 4,394,729 A | * 7/1983 | Armstrong | G06F 9/4486 712/243 |
| 7,251,735 B2 | * 7/2007 | Howard | G06F 21/52 710/55 |

(Continued)

FOREIGN PATENT DOCUMENTS

| | | |
|---|---|---|
| CN | 105787360 A | 7/2016 |
| DE | 102015223757 A1 | 6/2017 |

*Primary Examiner* — Daniel H Pan
(74) *Attorney, Agent, or Firm* — Eschweiler & Potashnik, LLC (57) ABSTRACT

Methods, circuitries, and systems for real-time protection of a stack are provided. A stack protection circuitry includes interface circuitry and computation circuitry. The interface is circuitry configured to receive a return instruction from a central processing unit (CPU). The computation circuitry is configured to, in response to the return instruction, generate protection data that i) identifies a new topmost return address location that is below a current protected topmost return address location and ii) specifies read only access for the new topmost return address location. The interface circuitry is configured to provide the protection data to a memory protection unit to cause the memory protection unit to enforce a read only access restriction on the new topmost return address location.

16 Claims, 4 Drawing Sheets

(56) References Cited

U.S. PATENT DOCUMENTS

| | | | |
|---|---|---|---|
| 9,015,835 B2* | 4/2015 | Gerzon | G06F 21/52 726/22 |
| 2009/0172332 A1* | 7/2009 | Ono | G06F 12/1425 711/163 |
| 2015/0220453 A1* | 8/2015 | Heisswolf | G06F 12/1441 726/27 |
| 2015/0220464 A1 | 8/2015 | Heisswolf et al. | |
| 2017/0076102 A1 | 3/2017 | Ishihara et al. | |

* cited by examiner

REAL TIME STACK PROTECTION

FIELD

The present disclosure relates to the field of memory stacks and in particular to methods and circuitry for protecting a memory stack from overflow that may corrupt the content of the stack.

BACKGROUND

A "stack buffer overflow" or "stack buffer overrun" occurs when a program writes to a memory address on the program's subroutine or call stack outside of the intended memory area, which is usually a fixed-length buffer. The stack buffer overflow bug occurs when a program writes more data than is allocated to a buffer located on the stack. This almost always results in corruption of adjacent data on the stack, and in cases where the overflow was triggered by mistake, will often cause the program to crash or operate incorrectly. Stack buffer overflow is a type of a more general programming malfunction known as buffer overflow (or buffer overrun). Overfilling a buffer on the stack is more likely to derail program execution than overfilling a buffer on the heap because the stack often contains the return addresses for all active function calls.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Stack buffer overflow can be caused deliberately as part of an attack known as stack smashing. When a program is running with special privileges, corruption of the subroutine stack creates a potential security vulnerability. If the stack buffer is filled with data supplied from an untrusted user then that user can corrupt the stack in such a way as to inject executable code into the running program and take control of the process.

Figures 1A, 1B:
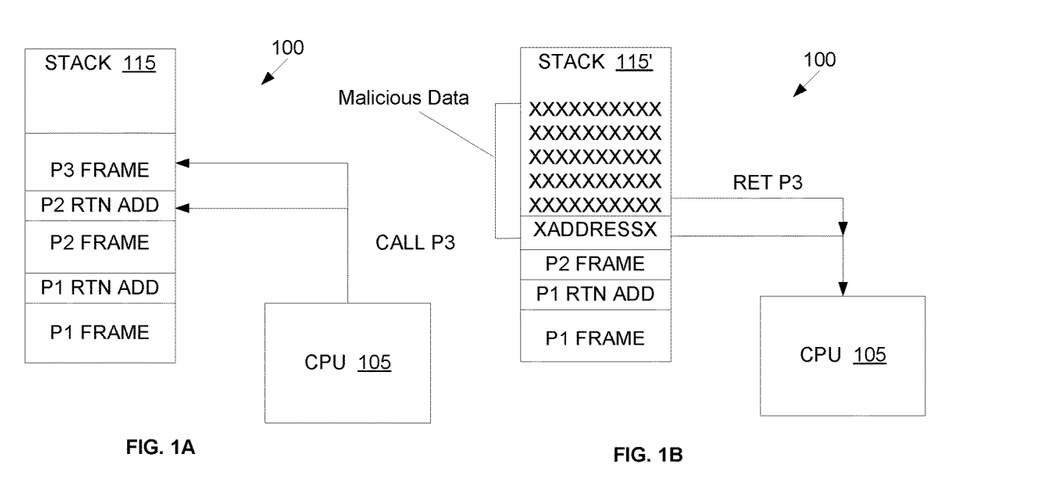
FIGS. 1A-1B illustrate operation of one example of a subroutine stack system that has experienced a stack smashing attack.

FIGS. 1A and 1B illustrate how a stack smashing attack may occur. A subroutine stack system 100 includes a central processing unit (CPU) 105 and a subroutine stack 115. When in the course of executing program instructions the CPU 105 calls a subroutine (e.g., executes a CALL operation), the CPU executes a PUSH operation to store the return address (i.e., the address at which the program should resume after returning from the subroutine) on the stack 115. The CPU 105 also executes a PUSH operation to store a new stack "frame" that contains any passed arguments and local variables to stack. After pushing both of these items onto the stack 115, the CPU moves to the start location of the called subroutine or function (these terms shall be used interchangeably).

For the purposes of this description, the memory locations allocated to the stack are adjacent to one another. Data is stored first in a "bottom" stack memory location having a highest address as amongst the memory allocated to the stack. As data is added to the stack, the stack "grows" in a direction of decreasing memory addresses. Of course, other stack memory location and growth protocols may be utilized in the practice of the described stack protection techniques and systems.

In FIG. 1A, the CPU 105 is executing the following pseudocode which is associated with a function P1. Note that a stack frame for the function P1 was stored in the stack 115 when the function P1 was called by the CPU 105.

```
int P1 ( int a, int b) {
    int c;
    C = P2(a,b);
}
```

When the CPU encountered the function P2, the CPU pushed the return address (P1 RTN ADD) to which the CPU should return after function P2 is executed. The CPU 105 also pushed a P2 stack frame containing any passed arguments and local variables for P2 onto the stack 115. The CPU 105 then moved to the P2 function:

```
int P2( int I, int j) {
    int a[10];
    return a[0] + I + j + P3(a[8]);
}
```

When the CPU encounters the function P3, as shown in FIG. 1A, the CPU pushes onto the stack 115 the return address (P2 RTN ADD) to which the CPU should return after function P3 is executed. The CPU 105 also pushes a P3 stack frame onto the stack 115. The CPU 105 then moves to the P3 function:

```
int P3( int k) {
    return k*8;
}
```

After executing P3, the CPU 105 executes a function return (a RET operation). To perform the function return operation, the CPU first destroys the stack frame at the top of the stack because it is no longer needed. The CPU 105 executes a POP operation to read the return address (P2 RTN ADD) stored in the top stack location (after the stack frame is destroyed). The CPU 105 then moves to the P2 RET ADD to resume processing associated with the function P2 now having a result for P3.

FIG. 1B illustrates a corrupted subroutine stack 115' and how the corrupted stack may allow a hacker to derail or take control of the operation of the CPU 105. Below is vulnerable program which can be used by hackers to take the control of system:

```
#include <string.h>
void input_process (char *bar)
{
    char c[12];
    strcpy(c, bar); // no bounds checking
}
```

In this code, hacker can provide a large array as the input to input_process( ) function which copies (char c[12]) into a local array without a bound check. Execution of this string copy without bound check can overflow the stack buffer and overwrite a return address in the buffer with an address containing code stored by the hacker. Once input_process( ) is executed, the stack will be overwritten to include the address programmed by hacker. This is illustrated by the Xs in the stack 115' which correspond to the malicious data and/or address written into the stack 115' by the hacker. It can be seen that during the return operation, the CPU 105 will read the address XADDRESSX stored by the hacker rather than the P2 RTN ADD stored during the function call of FIG. 1A.

Figure 1C:
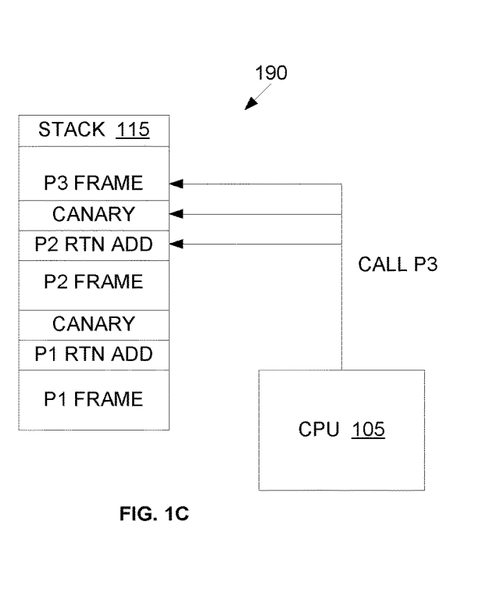
FIGS. 1C-1D illustrate operation of one example of a subroutine stack system that utilizes a canary to detect that a stack has been corrupted.
Figure 1D:
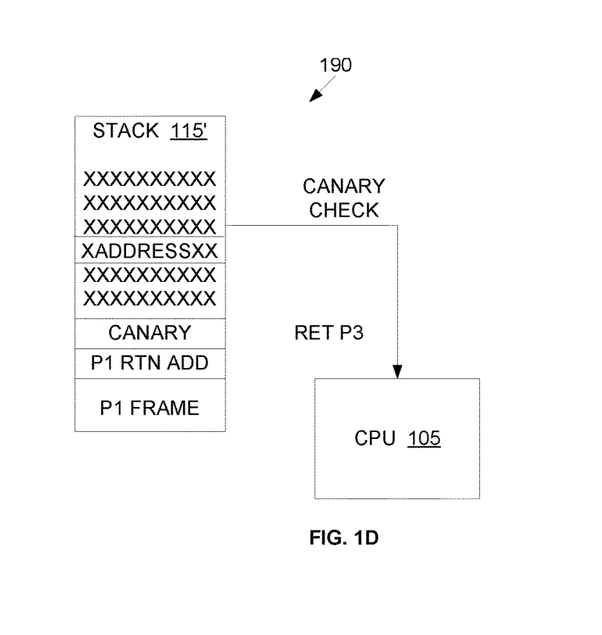

FIGS. 1C and 1D illustrate a subroutine stack system 190 that utilizes "canaries" to detect a stack buffer overflow before execution of malicious code can occur. In this technique the CPU 105 stores a small integer (i.e., a "canary"), the value of which is randomly chosen at program start, in the stack 115 just before the memory location of the return address. Most buffer overflows overwrite memory from lower to higher memory addresses (from the top of the stack toward the bottom of the stack), so in order to overwrite the return pointer and take control of the process the canary value must also be overwritten. During execution of the RET operation for P3, the CPU 105 checks the memory location that stores the canary value to see if the value is has changed before using the return address pointer (XADDRESSX) on the stack.

As seen in FIG. 1D, unless the malicious data includes the correct canary value, the CPU 105 will detect that the stack has been corrupted when the canary value is not correct. The canary technique can greatly increase the difficulty of exploiting a stack buffer overflow because it forces the attacker to guess the canary value. However, there are certain disadvantages of the canary solution. For example, the solution requires the use of additional memory and overhead for storing the canary values. The solution is prone to brute force attack (i.e., the hacker being able to guess the canary value). Importantly, the canary solution is non real time in nature, meaning that it does not detect the stack corruption at the time it occurs, but rather detection is delayed until the CPU checks the canary value during a return operation. Further, the canary approach only detects the stack corruption and does not prevent stack corruption.

The stack corruption detection techniques discussed above rely on software implementations in which detection is done in the prologue of a function call. This means that not only is the corruption not prevented, the corruption of the stack is not detected until a function call occurs. This lead to scenarios in which a graceful recovery may not be possible. Systems, circuitries, and methods described herein provide real time detection and prevention of stack corruption due to stack smashing or other causes. The described MPU based approach does not require the additional memory overhead of placing *canaries* to detect stack smashing and is also immune to brute force attacks.

Figure 2:
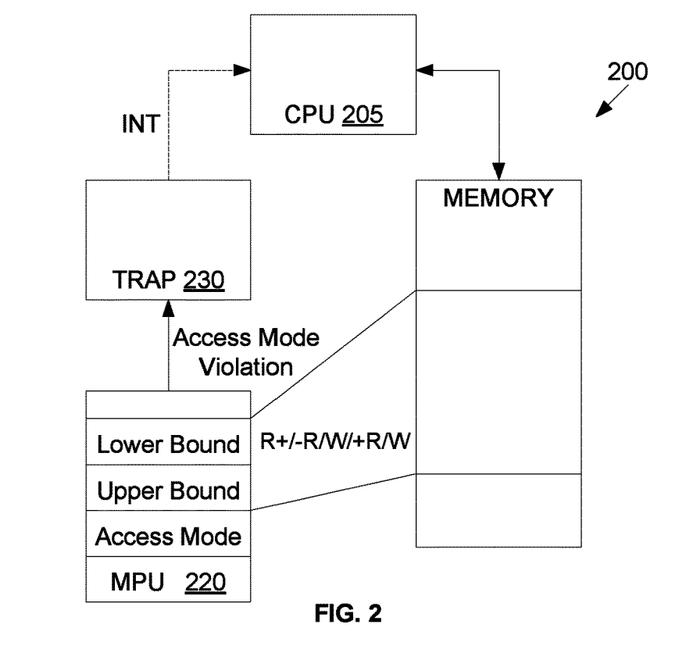
FIG. 2 illustrates one example of a memory protection unit (MPU).

Modern microprocessors are equipped with memory protection units (MPUs) and trap systems. FIG. 2 illustrates an example processing system 200 that includes a CPU 205, an MPU 220, and a trap system 230. Generally an MPU provides range based protection and page based protection. Range based protection is suited for low cost applications where virtual addressing (page based) is not a necessity. Range based MPUs provide interfaces called special function registers (SFR) that can be used to apply some attribute on a memory range. The SFRs in the MPU 220 include a Lower Bound register to program a lower address range bound and Upper Bound register to program an upper bound of address range for a region of memory to be given some particular access limitations. An Access Mode register stores an indicator for a certain type of access restriction (e.g., read only (R+), read and write (+R/W), neither read nor write (-R/W), and so on) to be applied to the range of addresses spanning the upper bound and lower bound stored in the Upper Bound SFR and the Lower Bound SFR, respectively.

The trap system 230 is hardware that is part of the CPU's interrupt system. The trap system 230 responds to certain conditions by providing a very high priority interrupt signal to the CPU 205. The CPU 205 responds to the trap interrupt by ceasing processing operations and immediately returning to a safe state. By virtue of its connection to the trap system 230, the MPU 220 is able to generate an interrupt to the CPU 205 as soon as an access violation on the protected range of memory is detected by the MPU.

Figure 3:
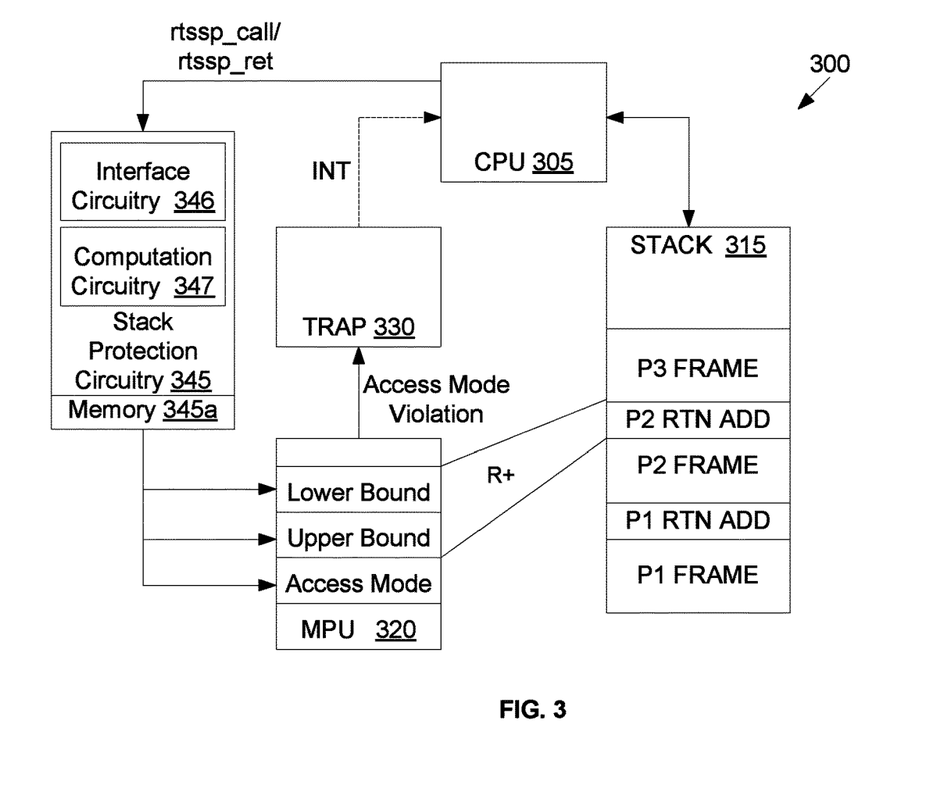
FIG. 3 illustrates one example of subroutine stack system that includes a real time hardware smashing detector/protector (RHSDP) circuitry.

FIG. 3 illustrates one example of a subroutine stack system 300 that includes a stack protection circuitry 345 that controls an MPU 320 and trap system 330 to detect and prevent corruption of a subroutine stack 315. The system 300 includes a CPU 305 that pushes stack frames and return addresses to the stack 315 during function calls and retrieves a "top" return address from the stack 315 when returning from a subroutine.

When the CPU 305 executes either an rtssp_call or rtssp_ret instruction (described in more detail below) the stack protection circuitry 345 programs the MPU 320 transparently in such a fashion that the stack memory location that stores a return address just below the location storing the topmost stack frame is kept in read only mode. Any attempt to write in the topmost return address location will be detected by the MPU 320 and the MPU will communicate an access mode violation to the trap system 330. In response, the trap system 330 generates a high priority interrupt for the CPU 305, thereby preventing the writing of malicious code to the stack 315. The topmost return address location which is protected by the stack protection circuitry 345 is P2 RTN ADD in FIG. 3. Hereinafter, this protected stack memory location will be referred to as the "topmost return address location".

To provide MPU-based subroutine stack protection, two new industry standard architecture (ISA) instructions, rtssp_call and rtssp_ret, are added to the standard CALL and RET operations. The syntax of rtssp_call is as follows:

rtssp_call arg1,arg2 where arg1=<return_address_location> arg2=<size_of_callee_stack_frame>

The return address location and size of the callee stack frame are received from the CPU 305 by interface circuitry 346 in the stack protection circuitry 345 when the CPU executes the rtssp_call operation.

The syntax of the rtssp_ret is as follows:

rtssp_ret arg1 where arg1=<size_of_ callee_stack_frame>

The size of the callee stack frame is received from the CPU 305 by the interface circuitry 346 when the CPU executes the rtssp_ret operation.

In one example, the rtssp_call and rtssp_ret instructions are implemented as processor or machine executable instructions stored in computer-readable media that is accessed by the CPU 305. Reading and execution of the instructions by the CPU causes the CPU to perform operations or functions corresponding to the operations outlined herein.

The stack protection circuitry 345 includes computation circuitry 347 configured to program the Upper Bound, the Lower Bound, and the Access Mode special registers of the MPU 320 based on the information passed to the interface circuitry 346 by the CPU during execution of the rtssp_call and rtssp_ret instructions. The computation circuitry 347 is hardware that generates appropriate "protection data" and stores the data in the special function registers. This causes the MPU 320 to "read only" (R+) protect a topmost memory location in the stack 315 that holds a return address. Therefore the MPU 320 will cause the trap system 330 to generate a trap interrupt in response to an attempt to write access the topmost return address location. In this manner, as the stack grows and shrinks, the stack protection circuitry 345, in response to receiving a new return address location and/or frame size information from the CPU 305, causes the MPU 320 to protect a different topmost return address location. In one example, the stack protection circuitry 345 includes a processor, either a dedicated processor or a processor also used for another purpose, and/or dedicated hardware including logic gates and registers.

Figure 4A:
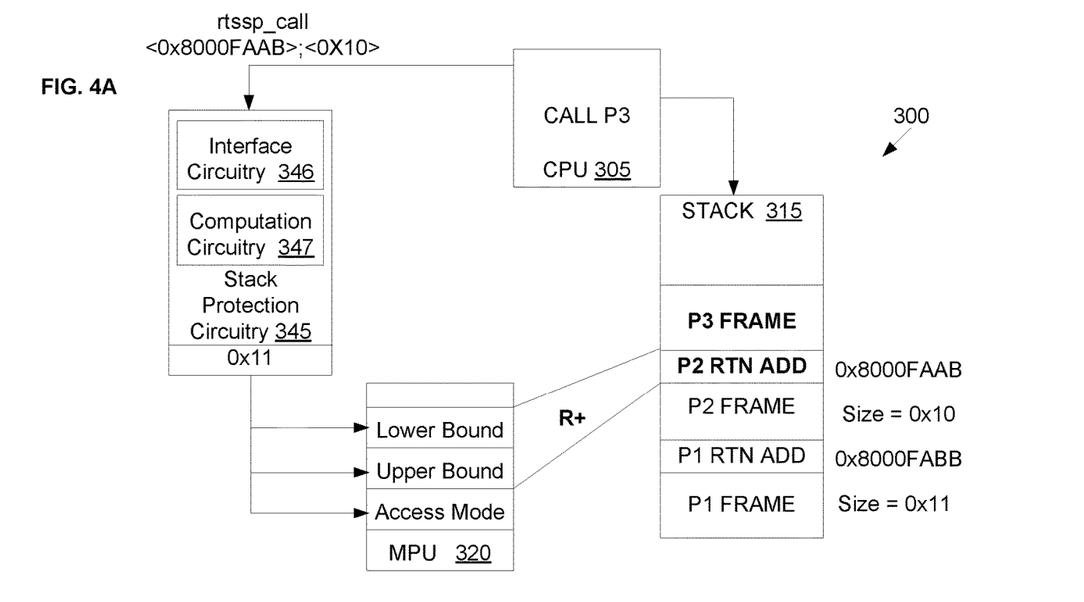
FIGS. 4A and 4B illustrate operation of one example of the subroutine stack system of FIG. 3.

FIG. 4A illustrates the subroutine stack system 300 of FIG. 3 during execution of an example P3 function call that is revised to include the new instruction rtssp_call. Prior to the P3 function call, the stack 315 holds a P1 stack frame and P1 return address in a "current" topmost return address location. For the purposes of this example, the P1 return address is located at memory location 0x8000FABB and the P1 stack frame has a size of 0x11 (e.g., 11 memory locations). A stack frame for function P2 is also stored on top of the P1 return address. For the purposes of this example, the P2 stack frame has a size of 0x10 (e.g., 10 (hexadecimal) memory locations). During execution of function P2, function P3 is called. As part of the CALL operation, the CPU 305 pushes the P2 return address into the "new" topmost return address location 0x8000FAAB.

During the revised CALL operation, the CPU 305 executes an rtssp_call instruction in which the CPU determines and provides the P2 return address location (0x8000FAAB) and the size of the "callee" or P2 stack frame (0x10) to the stack protection circuitry 345. When the CPU 305 is said to "provide" the various data, it is to be understood that the CPU 305 stores the data in designated memory accessible to the interface circuitry 346 (e.g., memory 345a in FIG. 3) or otherwise transmits or communicates the data to the interface circuitry 346.

In response to receiving the return address location and stack frame size, the computation circuitry 347 generates protection data. The protection data is stored by the interface circuitry 346 in the Upper Bound special function register and the Lower Bound special function register of the MPU 320 to cause the MPU to enforce a read only access restriction on the topmost return address location, which in this case is location 0x8000FAAB. In one example, the protection data stored in the Upper Bound SFR is location of the return address (e.g., 0x8000FAAB) and the protection data stored in the Lower Bound SFR is also the return address (e.g., 0x800FAAB). The protection data stored in the Memory Access SFR is data encoding the message "R+".

The computation circuitry 347 stores the P2 return address location and callee stack frame size information for the P2 stack frame (e.g., 0x10 in this example) in the memory 345a. The stored stack frame size information is used in a subsequent rtssp_ret operation to locate the stack memory location that stores the return address for P1. After executing the rtssp_call, the CPU pushes a P3 stack frame on top of the P2 return address in the stack 315 and moves to the function start location of subroutine P3.

Figure 4B:
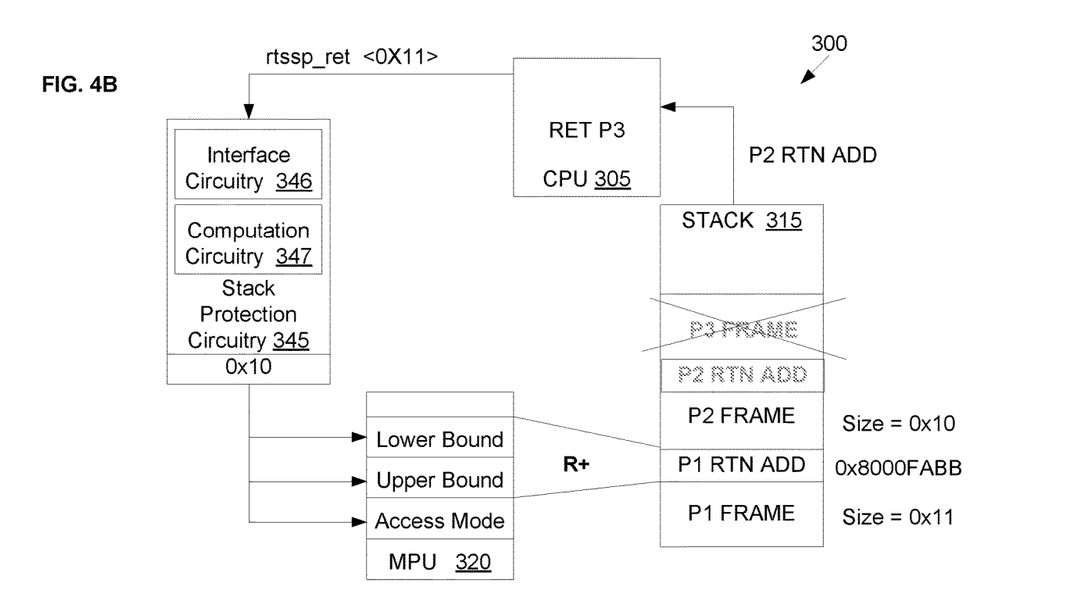

FIG. 4B illustrates how the CPU 305 executes a revised RET operation that includes new instruction rtssp_ret when function P3 is complete. First, the CPU executes the rtssp_ret operation which instructs the stack protection circuitry 345 to control the MPU 320 to remove the protection on the P2 RTN ADD location that was put in place in the previous call. The CPU also determines and provides the size of the next callee stack frame (0x11) to the interface circuitry 346. The computation circuitry 347 determines the next topmost return address location by adding the current stored frame size (0x10) the last active return address location (0x8000FAAB) to compute the location of the return address for P1 (0x8000FABB). The interface circuitry 346 stores protection data in the special function registers of the MPU 320 that causes the MPU 320 to restrict access to the topmost return address location (e.g., P1 RTN ADD in FIG. 4B).

The computation circuitry 346 then updates the stored stack frame size to reflect size of the current stack frame (0x11 for P1 stack frame). The CPU 305 destroys the P3 stack frame. After executing rtssp_call, the CPU POPs the P2 return address from the stack 315 and moves to the P2 return address. At this point, then, the MPU 320 is enforcing a read only access restriction on the topmost return address location (e.g., 0x8000FABB). If any attempt is made to write in 0x8000FABB, the MPU will prevent the writing and also trigger the trap system 330 to interrupt the CPU 305, thereby also detecting the attempted tampering and alerting the CPU immediately (in real time).

Figure 5A:
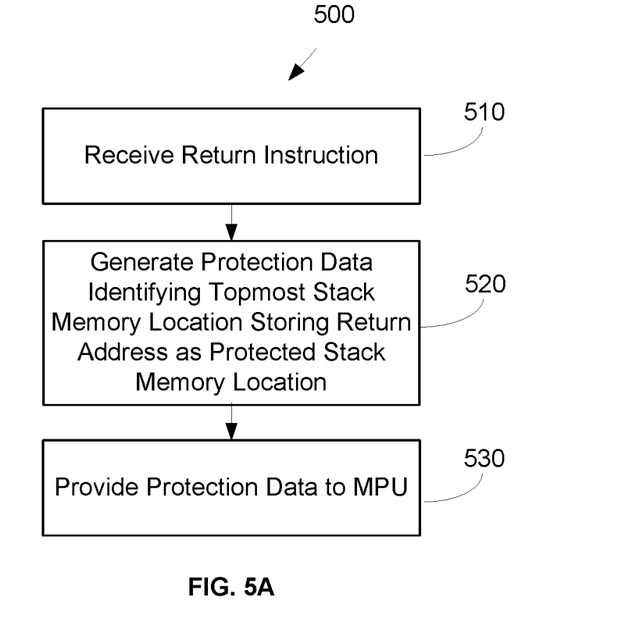
FIGS. 5A and 5B illustrate examples of a call and return method configured to detect and prevent an attempt to corrupt contents of a stack.

FIG. 5A illustrates an example method 500 for protecting a subroutine stack from corruption during a return from a subroutine. The method includes, at 510, receiving a return instruction from a central processing unit (CPU). At 520, protection data is generated that i) identifies a new topmost return address location that is below a current topmost return address location and is the topmost stack memory location that stores a return address and ii) specifies read only access for the new topmost return address location. The protection data is provided to a memory protection unit at 530 to cause the memory protection unit to enforce a read only access restriction on the new topmost return address location.

Figure 5B:
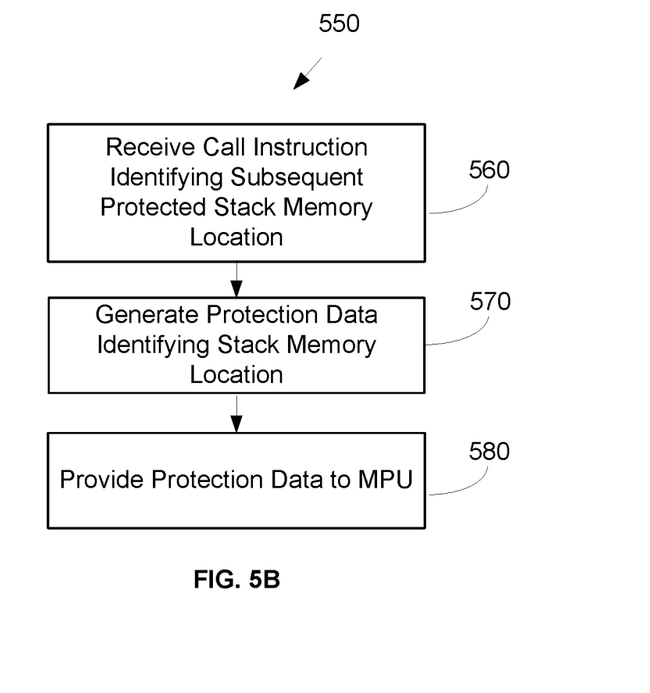

FIG. 5B illustrates an example method 550 for protecting a subroutine stack from corruption during a call of a subroutine. At 560, the method includes receiving, from a central processing unit (CPU), a call instruction that identifies a subsequent protected topmost return address location. At 570, in response to the call instruction, protection data is generated that identifies the subsequent protected topmost return address location. The protection data is provided to the memory protection unit at 580 to cause the memory protection unit to enforce a read only access restriction on the subsequent topmost return address location.

It can be seen from the foregoing description that the described stack protection systems, circuitries, and methods detect and prevent stack corruption in real time. The described systems, circuitries, and methods provide immediate indication that stack tampering has been attempted. Further, the described systems, circuitries, and methods prevent alteration of a topmost subroutine address.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for real time stack protection according to embodiments and examples described.

Example 1 is a stack protection circuitry, including interface circuitry configured to receive a return instruction from a central processing unit (CPU) and computation circuitry configured to, in response to the return instruction, generate protection data that i) identifies a new topmost return address location that is below a current protected topmost return address location and ii) specifies read only access for the new topmost return address location. The interface circuitry is configured to provide the protection data to a memory protection unit to cause the memory protection unit to enforce a read only access restriction on the new topmost return address location.

Example 2 includes the subject matter of example 1, including or omitting optional elements, wherein the interface circuitry is further configured to receive, from the CPU, a call instruction that identifies a subsequent protected topmost return address location; the computation circuitry is configured to, in response to the call instruction, generate protection data that identifies the subsequent protected topmost return address location; and the interface circuitry is configured to provide the protection data to the memory protection unit to cause the memory protection unit to enforce a read only access restriction on the subsequent topmost return address location.

Example 3 includes the subject matter of example 1, including or omitting optional elements, further including a memory configured to store a first identifier for the current topmost return address location and a first stack frame size, wherein the return instruction includes a second stack frame size. The computation circuitry is configured to generate the protection data based on the first stack frame size and the first identifier; store a second identifier for the new topmost return address location in place of the first identifier in the memory; and store the second stack frame size in place of the first stack frame size in the memory.

Example 4 includes the subject matter of example 3, including or omitting optional elements, wherein the interface circuitry is further configured to receive, from the central processing unit (CPU), a call instruction that includes a third identifier for a subsequent topmost return address location and a third stack frame size. The computation circuitry is further configured to, in response to the call instruction: generate protection data based on the third identifier and update the memory to store the third stack frame size in place of the second stack frame size. The interface circuitry is configured to provide the protection data to the memory protection unit to cause the memory protection unit to enforce a read only access restriction on the subsequent topmost return address location.

Example 5 includes the subject matter of examples 1-4, including or omitting optional elements, wherein the interface circuitry is configured to store the protection data in special function registers in the memory protection unit.

Example 6 includes the subject matter of examples 1-4, including or omitting optional elements, further including the memory protection unit and a trap system, wherein the memory protection unit is configured to communicate an access violation to the trap system in response to an attempt to write access the new topmost return address location.

Example 7 includes the subject matter of example 6, including or omitting optional elements, wherein the trap system is configured to generate a high priority interrupt for the CPU in response to receiving the access violation from the memory protection unit.

Example 8 is a central processing unit, configured to, during execution of a first subroutine: identify a CALL instruction for a second subroutine; determine a return address for the first subroutine and a stack frame size for the second subroutine; and provide the return address and the stack frame size for the second subroutine to a stack protection circuitry.

Example 9 includes the subject matter of example 8, including or omitting optional elements, further configured to store the return address and the stack frame size in a memory associated with the stack protection circuitry.

Example 10 includes the subject matter of examples 8-9, including or omitting optional elements, further configured to, during execution of the second subroutine: identify a RET instruction in the second subroutine; determine a stack frame size for the first subroutine; and provide the stack frame size for the first subroutine to the stack protection circuitry.

Example 11 is a method, including: receiving a return instruction from a central processing unit (CPU); and in response to receiving the return instruction, generating protection data that i) identifies a new topmost return address location that is below a current protected topmost return address location and ii) specifies read only access for the new topmost return address location; and providing the protection data to a memory protection unit to cause the memory protection unit to enforce a read only access restriction on the new topmost return address location.

Example 12 includes the subject matter of example 11, including or omitting optional elements, further including: receiving, from the CPU, a call instruction that identifies a subsequent protected topmost return address location; and in response to receiving the call instruction, generating protection data that identifies the subsequent protected topmost return address location; and providing the protection data to the memory protection unit to cause the memory protection unit to enforce a read only access restriction on the subsequent topmost return address location.

Example 13 includes the subject matter of example 11, including or omitting optional elements, wherein the return instruction includes a second stack frame size and wherein the method further includes: generating the protection data based on a first stack frame size and a first identifier for the current topmost return address location stored in a memory; storing a second identifier for the new topmost return address location in place of the first identifier in the memory; and storing the second stack frame size in place of the first stack frame size in the memory.

Example 14 includes the subject matter of example 13, including or omitting optional elements, further including: receiving, from the CPU, a call instruction that includes a third identifier for a subsequent topmost return address location and a third stack frame size; and in response to the call instruction: generating protection data based on the third identifier; updating the memory to store the third stack frame size in place of the second stack frame size; and providing the protection data to the memory protection unit to cause the memory protection unit to enforce a read only access restriction on the subsequent topmost return address location.

Example 15 includes the subject matter of examples 11-14, including or omitting optional elements, further including storing the protection data in special function registers in the memory protection unit.

Example 16 includes the subject matter of examples 11-14, including or omitting optional elements, further including: detecting an attempt to write access the new topmost return address location; and in response to the detecting, communicating an access violation to a trap system.

Example 17 includes the subject matter of example 16, including or omitting optional elements, further including, with the trap system, generating a high priority interrupt for the CPU in response to the access violation.

Example 18 is computer-readable media having computer-executable instructions stored thereon that, when executed by a processor, cause the processor to perform corresponding functions, the functions including: during execution of a first subroutine, identifying a CALL instruction for a second subroutine; determining a return address for the first subroutine and a stack frame size for the second subroutine; and providing the return address and the stack frame size for the second subroutine to a stack protection circuitry.

Example 19 includes the subject matter of example 18, including or omitting optional elements, wherein the functions further include storing the return address and the stack frame size in a memory associated with the stack protection circuitry.

Example 20 includes the subject matter of examples 18-19, including or omitting optional elements, wherein the functions further include: during execution of the second subroutine, identifying a RET instruction in the second subroutine; determining a stack frame size for the first subroutine; and providing the stack frame size for the first subroutine to the stack protection circuitry.

Example 21 is an apparatus, including: means for receiving a return instruction from a central processing unit (CPU); and means for generating protection data that i) identifies a new topmost return address location that is below a current protected topmost return address location and ii) specifies read only access for the new topmost return address location in response to receiving the return instruction; and means for providing the protection data to a memory protection unit to cause the memory protection unit to enforce a read only access restriction on the new topmost return address location.

Example 22 includes the subject matter of example 21, including or omitting optional elements, means for receiving, from the CPU, a call instruction that identifies a subsequent protected topmost return address location; and means for generating protection data that identifies the subsequent protected topmost return address location in response to receiving the call instruction; and in response to receiving the call instruction, providing the protection data to the memory protection unit to cause the memory protection unit to enforce a read only access restriction on the subsequent topmost return address location.

Example 23 includes the subject matter of example 21, including or omitting optional elements, wherein the return instruction includes a second stack frame size and wherein the apparatus further includes: means for generating the protection data based on a first stack frame size and a first identifier for the current topmost return address location stored in a memory; means for storing a second identifier for the new topmost return address location in place of the first identifier in the memory; and means for storing the second stack frame size in place of the first stack frame size in the memory.

Example 24 includes the subject matter of example 23, including or omitting optional elements, further including: means for receiving, from the CPU, a call instruction that includes a third identifier for a subsequent topmost return address location and a third stack frame size; and means for generating protection data based on the third identifier in response to the call instruction; means for updating the memory to store the third stack frame size in place of the second stack frame size; and means for providing the protection data to the memory protection unit to cause the memory protection unit to enforce a read only access restriction on the subsequent topmost return address location.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A stack protection circuitry configured to protect a stack, wherein the stack comprises a range of memory locations, wherein the stack includes a memory location storing a current topmost return address location corresponding to a return address for a most recently executed subroutine, the stack protection circuitry comprising:
   a memory configured to store a first identifier for the current topmost return address location and a first stack frame size;
   interface circuitry configured to receive a return instruction from a central processing unit (CPU), wherein the return instruction includes a second stack frame size; and
   computation circuitry configured to, in response to the return instruction:
      generate protection data based on the first stack frame size and the first identifier that i) identifies a new topmost return address location that is below the current topmost return address location and ii) specifies read only access for the new topmost return address location;
      store a second identifier for the new topmost return address location in place of the first identifier in the memory; and
      store the second stack frame size in place of the first stack frame size in the memory,
   wherein the interface circuitry is configured to provide the protection data to a memory protection unit to cause the memory protection unit to enforce a read only access restriction on the new topmost return address location.

2. The stack protection circuitry of claim 1, wherein:
   the interface circuitry is further configured to receive, from the CPU, a call instruction that identifies a subsequent protected topmost return address location; and
   the computation circuitry is configured to, in response to the call instruction, generate protection data that identifies the subsequent protected topmost return address location; and
   wherein the interface circuitry is configured to provide the protection data to the memory protection unit to cause the memory protection unit to enforce a read only access restriction on the subsequent topmost return address location.

3. The stack protection circuitry of claim 1, wherein:
   the interface circuitry is further configured to receive, from the central processing unit (CPU), a call instruction that includes a third identifier for a subsequent topmost return address location and a third stack frame size; and
   the computation circuitry is configured to, in response to the call instruction:
      generate protection data based on the third identifier; and
      update the memory to store the third stack frame size in place of the second stack frame size; and
   wherein the interface circuitry is configured to provide the protection data to the memory protection unit to cause the memory protection unit to enforce a read only access restriction on the subsequent topmost return address location.

4. The stack protection circuitry of claim 1, wherein the interface circuitry is configured to store the protection data in special function registers in the memory protection unit.

5. The stack protection circuitry of claim 1, further comprising the memory protection unit and a trap system, wherein the memory protection unit is configured to communicate an access violation to the trap system in response to an attempt to write access the new topmost return address location.

6. The stack protection circuitry of claim 5, wherein the trap system is configured to generate a high priority interrupt for the CPU in response to receiving the access violation from the memory protection unit.

7. A method configured to protect a stack, wherein the stack comprises a range of memory locations, wherein the stack includes a memory location storing a current topmost return address location corresponding to a return address for a most recently executed subroutine, comprising:
   receiving a return instruction from a central processing unit (CPU), wherein the return instruction includes a second stack frame size; and
   in response to receiving the return instruction:
      generating protection data based on a first stack frame size and a first identifier for the current topmost return address location, wherein the protection data i) identifies a new topmost return address location that is below the current topmost return address location and ii) specifies read only access for the new topmost return address location;
      storing a second identifier for the new topmost return address location in place of the first identifier in a memory; and
      storing the second stack frame size in place of the first stack frame size in the memory; and
   providing the protection data to a memory protection unit to cause the memory protection unit to enforce a read only access restriction on the new topmost return address location.

8. The method of claim 7, further comprising:
   receiving, from the CPU, a call instruction that identifies a subsequent protected topmost return address location; and
   in response to receiving the call instruction, generating protection data that identifies the subsequent protected topmost return address location; and
   providing the protection data to the memory protection unit to cause the memory protection unit to enforce a read only access restriction on the subsequent topmost return address location.

9. The method of claim 7, further comprising:
   receiving, from the CPU, a call instruction that includes a third identifier for a subsequent topmost return address location and a third stack frame size; and
   in response to the call instruction:
      generating protection data based on the third identifier;
      updating the memory to store the third stack frame size in place of the second stack frame size; and
      providing the protection data to the memory protection unit to cause the memory protection unit to enforce a read only access restriction on the subsequent topmost return address location.

10. The method of claim 7, further comprising storing the protection data in special function registers in the memory protection unit.

11. The method of claim 7, further comprising:
    detecting an attempt to write access the new topmost return address location; and
    in response to the detecting, communicating an access violation to a trap system.

12. The method of claim 11, further comprising, with the trap system, generating a high priority interrupt for the CPU in response to the access violation.

13. A stack protection system configured to protect a stack, wherein the stack comprises a range of memory locations, wherein the stack includes a memory location storing a current topmost return address location corresponding to a return address for a most recently executed subroutine, the stack protection system comprising:
    a trap system configured to generate an interrupt for a CPU in response to receiving a triggering input;
    a memory protection unit configured to:
       enforce a read only access limitation on a memory location; and
       provide a triggering input to the trap system in response to detecting an attempt to write to the memory location;
    stack protection circuitry, comprising:
       interface circuitry configured to receive a return instruction from a central processing unit (CPU); and
       computation circuitry configured to, in response to the return instruction, generate protection data that i) identifies a new topmost return address location that is below the current protected topmost return address location and ii) specifies read only access for the new topmost return address location; and
       wherein the interface circuitry is configured to provide the protection data to the memory protection unit to cause the memory protection unit to enforce a read only access restriction on the new topmost return address location.

14. The stack protection system of claim 13, wherein the trap system is configured to generate a high priority interrupt for the CPU.

15. A method configured to protect a stack, wherein the stack comprises a range of memory locations, wherein the stack includes a memory location storing a current topmost return address location corresponding to a return address for a most recently executed subroutine, the method comprising:
    receiving a return instruction from a central processing unit (CPU); and
    in response to the return instruction, generating protection data that i) identifies a new topmost return address location that is below the current topmost return address location and ii) specifies read only access for the new topmost return address location; and
    providing the protection data to a memory protection unit to cause the memory protection unit to enforce a read only access restriction on the new topmost return address location;
    in response to an attempt to write to the new topmost return address location:
       generating, with the memory protection unit, a signal indicative of an access violation;
       providing the signal to a trap system configured to generate an interrupt for a CPU in response to receiving signal.

16. The method of claim 15, further comprising generating a high priority interrupt for the CPU.

* * * * *